United States Patent [19]
Jannson et al.

[11] Patent Number: 5,067,788
[45] Date of Patent: Nov. 26, 1991

[54] HIGH MODULATION RATE OPTICAL PLASMON WAVEGUIDE MODULATOR

[75] Inventors: Tomasz P. Jannson; Joanna L. Jannson, both of Torrance; Behzad Moslehi, Redondo Beach, all of Calif.

[73] Assignee: Physical Optics Corporation, Torrance, Calif.

[21] Appl. No.: 496,799

[22] Filed: Mar. 21, 1990

[51] Int. Cl.⁵ .................................. G02B 6/26
[52] U.S. Cl. ............................ 385/2; 385/123
[58] Field of Search ............ 350/96.14, 96.15, 96.16, 350/96.19, 96.29, 96.30, 96.34, 353, 354, 355

[56] References Cited

U.S. PATENT DOCUMENTS

| | | | |
|---|---|---|---|
| 4,765,705 | 8/1988 | Seymour et al. | 350/96.15 |
| 4,844,613 | 7/1989 | Batchelder et al. | 356/318 |
| 4,877,747 | 10/1989 | Stewart | 350/96.15 X |
| 4,915,482 | 4/1990 | Collins et al. | 350/355 |

Primary Examiner—John D. Lee
Attorney, Agent, or Firm—Nilles & Nilles

[57] ABSTRACT

A high-speed light modulator employing surface plasmon wave coupling comprises a metal-dielectric interface positioned adjacent to and externally of a waveguide carrying totally internally reflected light waves. A high frequency voltage applied to the interface causes the dielectric, in the preferred case an ultra-fast electro-optic polymer, to resonate, generating a surface plasmon wave at the interface. The plasmon wave couples with the evanescent wave portion of the light waves in the waveguide. The output intensity of the light waves varies inversely with the strength of coupling between the light wave and surface plasmon wave modes. The modulator eliminates bulk and alignment problems associated with state of the art modulators and can be employed in integrated optic circuits.

12 Claims, 4 Drawing Sheets

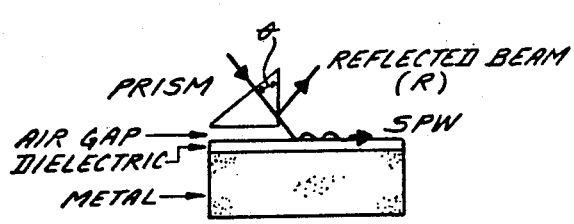
FIG. 1
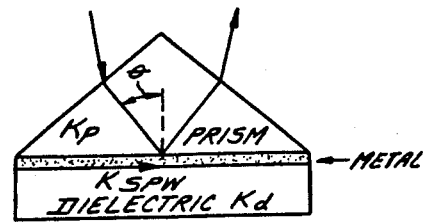
FIG. 2
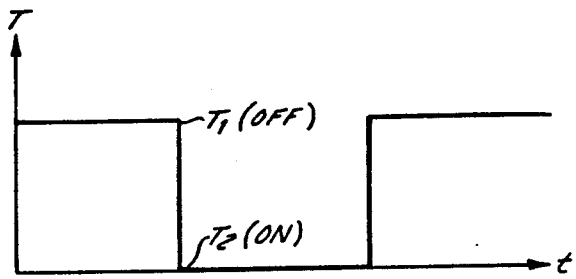
FIG. 6
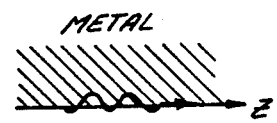
FIG. 4
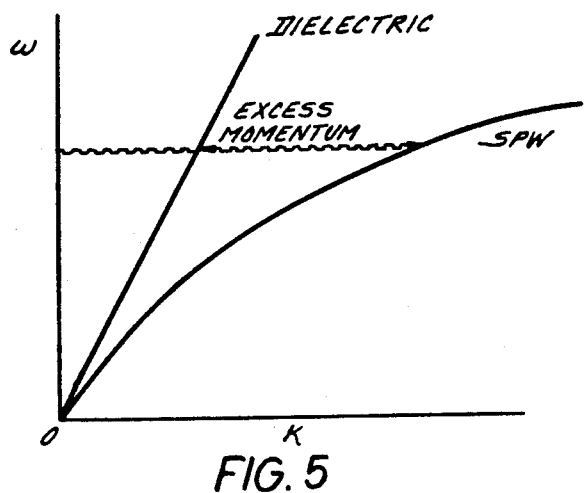
FIG. 3
FIG. 5

HIGH MODULATION RATE OPTICAL PLASMON WAVEGUIDE MODULATOR

BACKGROUND OF THE INVENTION

1. Field of the Invention

This invention pertains to high speed modulation of light. More particularly, this invention concerns apparatuses that modulate light through surface plasmon wave interaction.

2. Description of the Prior Art

A surface plasmon wave (SPW) is an electromagnetic wave supported by the interface between a metal and a dielectric material. Metal and all conductors can be defined as a gas of electrons in statistical equilibrium inside a continuum of positive fixed charges. It is a condensed electronic plasma with electronic charge density approximately equal to $10^{23}$ electrons per $cm^3$. Plasmons are natural energy quanta associated with the collective electronic charge oscillations in the metal. Because of high electron density, quantum effects dominate. Such waves are generally discussed in A. D. Boardman, ed., "Electromagnetic Surface Modes", John Wiley Pub. (1982), incorporated by reference herein.

Surface plasmon waves can be optically excited by resonant coupling. The condition for resonance is strongly dependent on the refraction indices and thicknesses of the media near the metal-dielectric interface. The intensity of the light wave can be modulated by coupling the light wave with the surface plasmon wave. Typically, if coupling between the surface plasmon wave and the light wave is strong, the light wave attenuation is strong, and if coupling is weak the light wave propagates with little or no attenuation. Attenuated total reflection (ATR) effect has been utilized to optically excite surface plasmon waves through a high-index prism. Light, traveling in free-space, is sent toward the metal-dielectric interface through the prism with an angle larger than the critical angle, producing an evanescent field which may overlap the surface plasmon wave field. Two configurations have been used for optically exciting surface plasmon waves in a bulk-optic arrangement. The first is Otto's ATR configuration. In Otto's configuration there is a small air gap between a high-index prism and a thin dielectric layer deposited on a thick metal substrate. Otto's configuration can be seen in FIG. 1 and is discussed further in A. Otto, "Excitation of Nonradiative Surface Plasma Waves in Silver by the Method of Frustrated Total Reflection", 216 Z. Phys. 398-410 (1968) incorporated by reference herein. Another configuration used to optically excite surface plasmon waves is Kretschmann's modified ATR configuration as shown in FIG. 2. In this configuration, a thin metallic foil is sandwiched between a prism and a dielectric substrate. This configuration is more practical since there is no air gap. This type of configuration is disclosed in U.S. Pat. No. 4,451,123. Schildkraut, "Long-Range Surface Plasmon Electro-optic Modulator", 27 Appl. Opt. 4587 (1988) and E. Kretschmann, "Die Bestimmung Optischer Konstanten von Metallen durch Anreguns von Oberflachenplasma-schwingungen", 241 Z phys. 313-24 (1971), incorporated by reference herein, are also of interest for their discussion of such prism configurations.

Surface plasmon wave effects can be discussed from two viewpoints. The first is the quantum mechanical viewpoint which deals with photons, electrons, plasmons, and other particles and the interaction between those particles. The energy of such particles can be described by the equation $$E = h\nu. \quad \text{(Eq. 1)}$$

This equation describes the energy and the momentum of particles. The interaction between light and metallic mediums can be understood by considering the gas-like nature of electrons in metals (fermi gases) and by considering the electrons as plasmas, i.e., media containing charged particles (ions).

Plasmons have resonant frequencies. If a plasmon is stimulated by radiation at its resonant frequency, resonance is observed and some of the energy of the stimulating radiation is absorbed by the plasmon. So from the quantum particle point of view, surface plasmon wave systems are discussed in the context of the interaction of particles in a plasma having certain resonances.

The other view point from which to discuss surface plasmon waves involves Maxwell's equations, materials constants, and boundary conditions. In a simple model, metal can be characterized by a complex dielectric constant according to the following equation $$\epsilon_m = \epsilon_{real} + i\epsilon_{imag} \quad \text{(Eq. 2),}$$

$$\text{where } \epsilon_{real} = 1 - \left[\frac{f_p\text{bulk}}{f}\right]^2 \quad \text{(Eq. 3)}$$

$$\text{The bulk plasmon frequency is } f_p = e\sqrt{\frac{n}{\pi m}} \quad \text{(Eq. 4)}$$

where m is the electron mass and $n = 10^{23}$. Thus the following obtains:

$$f_p\text{bulk} = 3 \times 10^{15} \text{ Hz or } \lambda_p\text{bulk} = 0.1 \text{ um} \quad \text{(Eq. 5)}$$

In surface plasmon wave technology, it is not the bulk plasmon that is important but rather the surface plasmon, the latter describing electron behavior at the metal boundary. The natural oscillation frequencies of surface electrons are a strong function of both the surface geometry and the interfaced dielectric medium. For planar boundaries and simple metals, the surface plasmon frequency is related to the bulk frequency by $$f_p\text{surface} = \frac{f_p\text{bulk}}{\sqrt{\epsilon_{dielectric} + 1}} \quad \text{(Eq. 6)}$$

In general the resonant optical wavelengths (frequencies) of the surface plasmon can be adjusted within a broad spectrum including UV, VIS, and nIR. This is in contradistinction to the bulk wavelength which is located in the UV area only, at about 0.1 um. In the state of the art, surface plasmon effects are realized by using the Kretschmann configuration wherein the attenuated total reflection effect has been utilized to optically excite SPWs through a prism. Note that in general the surface plasmon wave cannot be excited by direct coupling because momentum and energy conservation laws cannot be satisfied simultaneously. In the Kretschmann configuration, however, both conservation laws are satisfied.

A numerical example of the SPW mode index is shown in FIG. 3 which is a table showing two metal types, aluminum and gold, the former having a higher index of refraction, and two dielectric types, air and glass, the latter having a higher dielectric constant. From FIG. 3 it can be seen that the real part of the SPW mode index is larger than the dielectric index, the imaginary part of the SPW mode index is smaller with a metal having a lower index of refraction such as gold, and for a given metal the imaginary part of the SPW mode index is larger with the dielectric of the higher index. FIG. 4 shows the metal-dielectric interface along the Z-axis having a surface plasmon wave whose wavelength in vacuum, $\lambda_o$, equals 0.83 um.

With respect to surface plasmon wave phase velocity and propagation loss, the surface plasmon wave normalized propagation constant (mode index) can be represented by a complex quantity.

$$n_{SPW} = n^R_{SPW} + i n^I_{SPW} \qquad \text{(Eq. 7)}$$

where $n^R_{SPW}$ and $n^I_{SPW}$ are, respectively, the real and imaginary parts. The surface plasmon wave phase velocity is given by $$v_{SPW} = \frac{c}{n^R_{SPW}} \qquad \text{(Eq. 8)}$$

where c is the speed of light in vacuum.

SPW propagation loss per unit length L is determined by the imaginary part of the propagation constant. In decibel units, we have loss $$(db) = 10 \log_e - 2k \, n^I_{SPW} \times L \qquad \text{(Eq. 9)}$$

or loss $$\frac{(db)}{mm} = -54.6 \times 6 \times \frac{10^3}{\lambda_{0(um)}} \times n^I_{SPW} \qquad \text{(Eq. 10)}$$

where $\lambda_0$ is the light wavelength in vacuum.

As mentioned above, surface plasmon waves in a smooth plain boundary cannot be excited optically by direct coupling. This is because the momentum and energy conservation laws cannot be satisfied simultaneously. This can be seen in the w-k diagram for the dielectric medium and SPW, where there is no intersection between the two curves as shown in FIG. 5. For a given frequency, the SPW momentum exceeds the light momentum in the dielectric. Direct coupling using rough surfaces is possible but difficult to analyze. Evanescent wave coupling, as discussed above in the context of Otto's and Kretschmann's couplers, is necessary.

State of the art high speed modulators include the multiplex quantum well (MQW). MQW modulators offer extremely high frequency (greater than 5 GHz) with very short interaction lengths (microns), fairly low drive voltages (less than 10 volts), and moderate insertion loss (less than 3 dB) in the visible through near IR (nIR) spectrum. MQW modulators have been applied to a broad variety of optical signal processing, computing, storage, and communication schemes which require fast modulation or switching. The MQW modulator is comprised of numerous thin semiconductor layers which, when a voltage applied thereto is varied, varies the intensity of light passing through the modulator. MQW modulators use semi-transparent semiconductor material. Unfortunately, MQW techniques are difficult to implement, very expensive, and may even be inapplicable in extreme environmental conditions.

Recent progress in long distance fiber optic communication has stimulated the development of a variety of switching techniques for communication networks, local area networks (LAN), high power laser beam repetition, spatial light modulation (SLM), and external LD modulation. These techniques, the applications of which are more universal than those of MQWs, have been applied not only to fiber optic communication but also to optical computer, sensing, high power laser printing, laser surgery, etc. These other types of technologies include magneto-optic SLMs which are relatively slow (kHz), exhibit high electric power consumption, and high optical material loss. Examples of magneto-optic SLMs include those produced by Semetex. Another is liquid crystal (LC) SLMs which are relatively fast, and are based on ferroelectric LCs with a 20 ns (or longer) maximum response time. Yet another is a photo refractive switch which is based on LiNbO$_3$ such as those produced by Crystal Technology, Inc. or based on PLZT, the latter having approximately 70 ns or more response times. MQW modulators which are very fast (greater than one picosecond) are discussed above. Finally there is the class of plasmon modulators which are super fast (greater than 5 picoseconds).

The latter two types of modulation technology—MQW and plasmon modulators—have a fundamental advantage over the first four switching systems, namely at least three orders of magnitude higher speed. In addition, the latter two technologies involve lower power consumption and drive voltage. The surface plasmon wave technology, however, has certain important advantages over the MQW technology. First, the wavelength range of the SPW technology extends from near IR to visible. MQW technology is near IR. Both technologies have about the same modulation frequency, potentially greater than 100 GHz. Likewise, the interaction lengths of MQW and SPW technology are both rather short, ~100 um.

With regard to interaction length discussed above, interaction length is the distance over which the material of the modulator interacts with the light beam. In an ideal case the on-state of a modulator would fully absorb the light beam, and the off-state would fully transmit the light beam. How close a modulator system comes to the ideal case can be expressed in the form of the extension ratio (ER), where in the ideal case ER equals infinity.

$$ER = \text{off-state intensity/on-state intensity}. \qquad \text{(Eq. 11)}$$

In the alternative ER can be expressed as $$ER = W = T_1/T_2 \qquad \text{(Eq. 12)}$$

$T_1$ is the fully off-state (value 1), and $T_2$ is the fully onstate (value 0) as shown in FIG. 6. Also in the ideal case the speed, or modulation frequency, will be as great as possible. Typically, however, real systems have limited W and speed. If the interaction length, L, is short, $T_1$ is low in the usual case. If the interaction length, L, is very long, it is usually the case that $T_1$ is high (which makes the modulator system bulky and inefficient). A moderate interaction length can be measured in millimeters, while a short interaction length is less than a millimeter.

The drive voltage of MQW technology is higher than SPW technology. MQW voltage levels are −10 volts and SPW voltage levels are less than one volt. Lower drive voltages mean less power consumption. Insertion loss for the SPW system is only −3 db per meter, whereas insertion losses for MQW are −3 db per centimeter. Insertion loss is a measurement of off-state absorption. Note that the insertion loss of SPW modulators is measured on the meter scale.

The cost of making MQW modulators is very high, while the cost of the SPW technology is low. The cost of MQW technology is high in part because it requires sophisticated GaAs VLSI processing. Furthermore, the laser damage threshold of SPW modulators is extremely high, while that of MQW technology is low. All semiconductor devices, including MQW devices, have poor laser damage thresholds and are highly temperature sensitive. Similarly, ruggedization and environmental stability is low for MQW modulators and high for SPW modulators.

Lastly, the basic material used in MQW systems is GaAs, while the basic material for SPW technology is polymer-glass. Thus, from a materials point of view, MQW technology is closely related to laser diode (LD) technology which is likewise semiconductor based, while the SPW technology is dielectric based and thus closely related to low insertion loss fiber-optic media technology. Therefore, in contrast to MQWs, SPWs can also be used in high power laser switching and modulation with very high laser damage thresholds, greater than 1 GW per $cm^2$.

Generally, in optoelectronics two basic trends have emerged. The first follows printed circuit GaAs VLSI electronics technology which is heavily semiconductor based. Refractive indices of these materials are in the range of about $n = 2 - 4$. The second, and more recent, trend follows glass-polymer technology. The general advantage of this technology is that glass and polymers are compatible with most optical materials, have very low absorption, and can be used with many adhesives and recording materials having a low index of refraction. One problem that low index of refraction ($n = 1.5 - 1.6$) presents is high Fresnel reflection losses if two substantially different materials (say, polymer and GaAs) are used. Antireflection coatings, however, lessen this effect. The basic advantage of the first trend, which follows printed circuit VLSI technology, is that this technology is compatible with most light sources such as GaAs sources and LDs. Thus, it can be said that MQW technology is light source compatible and that SPW technology is materials compatible.

Highly sensitive passive sensing devices based on surface plasmon wave interaction have been used to sense a broad variety of conditions. The condition to be sensed changes the optical properties of the sensing medium which in turn changes the resonance conditions. TM intensity also changes. The intensity change can be detected at the other end of the fiber and is a measure of the field to be sensed. Such passive sensors may be used to sense gases, chemicals, temperature, stress, strain and magnetic fields, for example. These types of sensors are discussed in "Fiber-Optic Sensor Based on Surface Plasmon Wave Resonant Coupling", Poster Paper: Meeting of OSA (Opt. Soc. of Amer.) October, 1988, Santa Clara, Calif. A prism-based surface plasmon sensor is disclosed in U.S. Pat. No. 4,844,613.

It can be seen that there are numerous advantages of surface plasmon wave modulators over MQW modulators. However, as also shown above, state of the art surface plasmon modulators are of the bulk-optic type, wherein a prism is used to effect coupling between a free-space light beam, whose source is usually a bulky and expensive laser such as HeNe, and the metal-dielectric interface which supports the surface plasmon wave. Bulk type systems suffer from stability and alignment problems. Furthermore, the speed advantage of SPW bulk-optic systems is not much greater than MQW type systems. A super high speed non-bulk SPW modulator is needed.

SUMMARY OF THE INVENTION

A surface plasmon wave modulator is presented. Specifically, a surface plasmon wave modulator employing polymer glass materials and a super fast electro-optic controlling medium for modulating laser light at ultrahigh frequencies is disclosed. The active surface plasmon modulator may be configured in either a planar integrated or fiber-optic format by coupling a guided light wave with a surface plasmon wave generated at the interface of a metal electrode and an electro-optic material disposed close to the optical path containing the guided light waves. The light wave is totally internally reflected within the path and is surrounded by an evanescent wave which extends outside of the boundaries of the path.

A surface plasmon wave is generated at the metal-electro-optic material interface by applying an external electromagnetic field to the metal electrodes on either side of the material. The surface plasmon wave is coupled with the evanescent wave portion of the light wave traveling in the optical path. When the coupling between the two waves is strong the light energy is absorbed by the surface plasmon wave and the intensity of the light decreases. When the coupling between the two waves is weak the intensity of the light wave is less attenuated.

The advantageous structure of the surface plasmon modulator of the present invention eliminates the bulk and alignment problems of bulk type modulators and allows the switching system comprising the metal-dielectric interface to be located totally externally of the light source and the light wave guide significantly lowering beam deformation and insertion losses. The modulator may also be used in integrated optic circuits where size constraints govern. Switching can be achieved with changes in the index of refraction of the electro-optic material of less than $10^{-3}$ thus making the voltage requirements of the surface plasmon modulator minimal.

DESCRIPTION OF THE DRAWINGS

FIG. 1 is a schematic of a prior art surface plasmon wave generator by Otto;

Figure 7A:
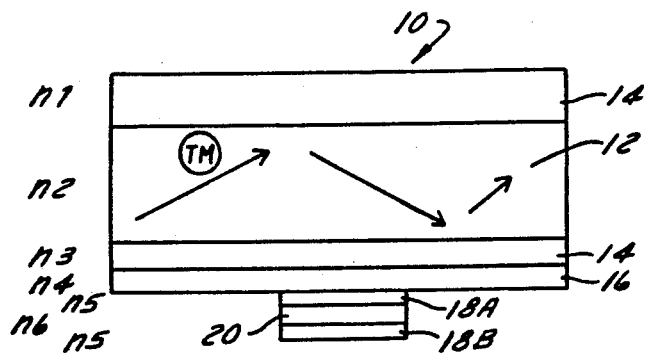
Figure 7B:
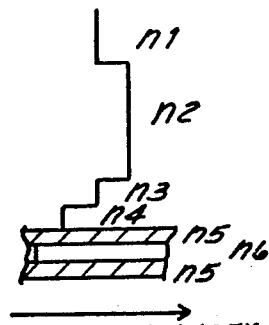
Figure 9:
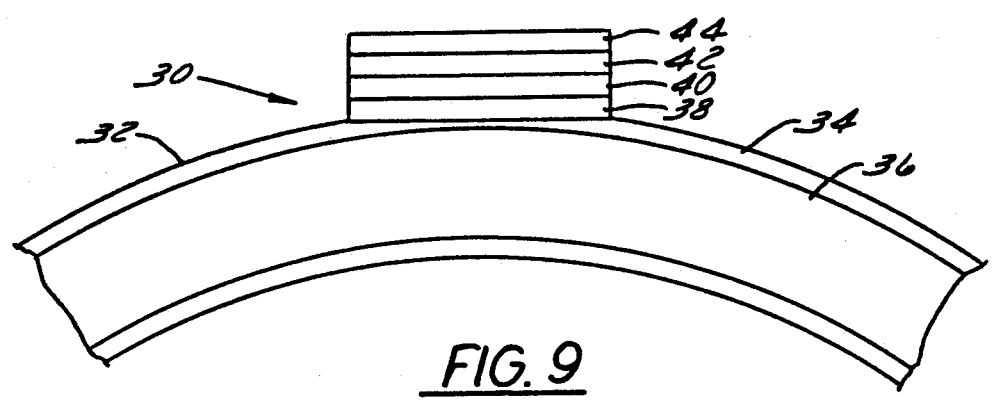
Figure 10:
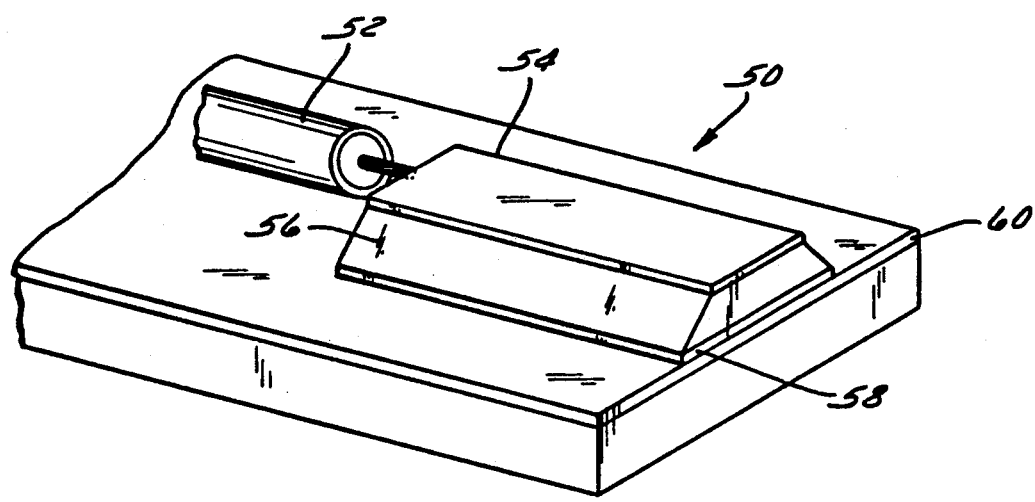

FIG. is a schematic of a prior art surface plasmon wave generator by Kretschmann;

FIG. 3 is a chart comparing the index of refraction changes achievable with different combinations of metals and dielectrics in a modulator of the present invention;

FIG. 4 is a schematic of a surface plasmon wave traveling at the metal dielectric interface for $\lambda_0 = 0.83$ um;

FIG. 5 is a dispersion diagram showing that the momentum and energy conservation laws cannot be satisfied simultaneously by direct coupling;

FIG. 6 is a schematic of the on and off transmission states versus time of a surface plasmon wave modulator;

FIGS. 7A and 7B are schematics of a surface plasmon wave modulator in planar format of the present invention;

FIGS. 8A-D are various graphs showing the dependency of resonance and losses on sensing medium index (8A) and showing the dependency of output intensity and guided mode angle on applied voltage (8B-D);

FIG. 9 is a schematic of a surface plasmon wave modulator in fiber-optic format of the present invention; and FIG. 10 is a schematic of a microstrip electrode embodiment of a surface plasmon wave modulator of the present invention.

DESCRIPTION OF THE PREFERRED EMBODIMENT

A preferred embodiment of the plasmon wave modulator which operates in the electromagnetic mode (TM polarization), presents a strongly localized plasmon wave at its interface (maximum at the interface and exponentially decaying away from the interface), has a complex propagation constant which is extremely sensitive to optical properties very near the interface, and has high light wave propagation losses for TM polarization is now described.

Referring now to FIG. 7, a surface plasmon wave modulator device 10 of the present invention is shown. The surface plasmon wave modulator 10 is an active planar, multilayer structure comprising a single-mode planar optical path (planar waveguide) 12 sandwiched between two layers of cladding material 14 against the lower layer of which are disposed two metal electrodes 18A, 18B and electro-optic material 20 sandwiched between the metal electrodes. The respective refractive indices of each of the layers in the multilayer structure 10 can be seen in FIG. 7B. The uppermost layer of cladding material 14 has refractive index $n_1$, the planar waveguide has refractive index $n_2$, the lower layer of cladding material 14 has refractive index $n_3$, the buffer, refractive index $n_4$, both metal electrodes have complex refractive index $n_5$, and finally the electro-optic material has refractive index $n_6$.

Also shown in FIG. 7B is a schematic of the refractive indices of each of the layers which shows the relative refractive indices of each layer. It can be seen that the refractive index $n_2$ of the waveguide is larger than the refractive indices $n_1$ and $n_3$ of the cladding, and the refractive index $n_2$ is larger than the refractive index $n_4$ of the buffer. It can also been seen that the refractive index, $n_6$, of the electro-optic material is less than the refractive index, $n_2$, of the waveguide.

The relative thicknesses of the layers in the planar multilayer surface plasmon wave modulator structure 10 are critical to obtaining coupling of the TM portion of the light wave and the surface plasmon wave generated at the metal-electro-optic material interface. The distance between the waveguide 12 and the metal dielectric interface between electrode 18A and electro-optic material 20 must be short. The thickness of the lower cladding layer 14, the buffer 16 (approximately 0.1 um), both electrodes 18A, 18B and the electro-optic material sandwiched between them may preferably be on the order of only 0.5 um, while the thickness of the planar waveguide 12 may preferably be 6 um. Overall, the surface plasmon wave modulator 10 has a thickness on the order of 10 um including the waveguide layer.

The overall length of the electrode-electro-optic material sandwich 18A, 18B, and 20 can be short, on the order of 100 um and defines the active region of the modulator 10. Likewise, the length of the electrode can be extremely short, on the order of 10 um. The highly integrated architecture of the modulator 10 makes it extremely compact, as well as rugged and resistant to environmental influences.

The cladding 14 may preferably be cladding typically used for encasing optical waveguides. The most important limitation of the cladding is that the layer of cladding between the waveguide and the electro-optic material must be kept thin. The optical waveguide 12 may preferably be a waveguide that supports only one light wave mode, i.e., a single mode waveguide. Because the electro-optic material 20 is separated from the waveguide 12 by two intermediate thin layers of cladding 14 and buffer 16, the waveguide 12 material can be neutral such as GaAs (or glass), for example. Generally, the waveguide material can be any optically transparent material suitable for the transmission of an optical wave. The buffer can be made of a dielectric material of refractive index less than the waveguide material. A preferred buffer material is calcium floride $CaF_2$. The metal electrodes 18A, 18B may preferably be made of metals such as gold, aluminum, silver, or other similar metals and may be on the order of 100 Å thin. A superconductor such as YeBaCuO may also be used.

The electro-optic material 20 may preferably be a second order nonlinear polymer, called an electro-optic polymer, which has a response time measured in picoseconds and very low refractive index amplitude modulation requirements (less than $10^{-2}$). Electro-optic polymers include those made by Dupont and Celanese. A preferred polymer is methyl nitro aniline. In state of the art modulators, liquid crystals, such as ferroelectric crystals which have one nanosecond response times have been used and may be used in the present invention as well.

Note that liquid crystals usually have high voltage requirements, on the order of 10 volts. Newer polymers such as Celenese polymer require only 3.3 volts. The preferred electro-optic polymers of the present invention, however, require voltages on the order of one volt. Note also that the typical LC speed is one millisecond, and for smectic LCs is about 20 nanoseconds, and for PLZT is less than 70 nanoseconds, while for typical electro-optic polymers, the speed is far higher, less than one picosecond.

In short, the preferred electro-optic polymers are better than LCs in three important respects: required voltage is smaller by two orders of magnitude, speed is higher by three orders of magnitude, and the contrast ratio is better by one order of magnitude, while transmission is comparable for the two types of materials in the most important near IR region (0.7-1.3 um).

Photorefractive materials such as PLZT, which require higher driving voltages, may be used as well. The extremely high sensitivity and super-fast response times of electro-optic polymers, however, make them the material of choice for the electro-optic material 20 layer of the modulator 10 of the present invention.

The surface plasmon wave modulator 10 is operated by the interaction of the evanescent wave produced by single-mode waveguide 12 of a light wave emitted by, for example, a laser diode (LD). As noted earlier, the waveguide 12 may preferably support only one mode due to its extreme thinness. A voltage applied across the metal electrodes 18A, 18B changes the refractive index $n_6$ of the electro-optic material 20. The amount of voltage needed is directly related to the sensitivity of the electro-optic material 20 chosen for the particular surface plasmon wave modulator 10.

Two different optical modes can be supported in the surface plasmon wave modulator 10: (1) a guided mode of the waveguide 12 core, and (2) a surface plasmon mode in the interface between the metallic foil 18 and the electro-optic layer 20. Energy from the guided core mode is resonantly coupled to the surface plasmon wave interface mode if the phase velocities of the two modes are matched. The phase matching condition is controlled by the refractive index of the electro-optic material 20 by applying an electric field. The thin buffer layer 16 aides in satisfying the phase-matching condition. The TM polarization component of the light wave couples into the surface plasmon wave interface mode, while the TE polarization propagates through unchanged. Therefore, if the input light is TM polarized then its power will couple into the interface mode for the phase matched case. The TM polarization power goes through unchanged if not phased matched, while the interface mode dissipates in the metallic foil as ohmic heat. Thus, the output power level is controlled by the applied field. Note that the switching system comprising the metal electrodes 18A, 18B and the electro-optic material 20 is located totally externally not only to the LD but also to the waveguide. This significantly lowers beam deformation and insertion losses.

Figure 8A:
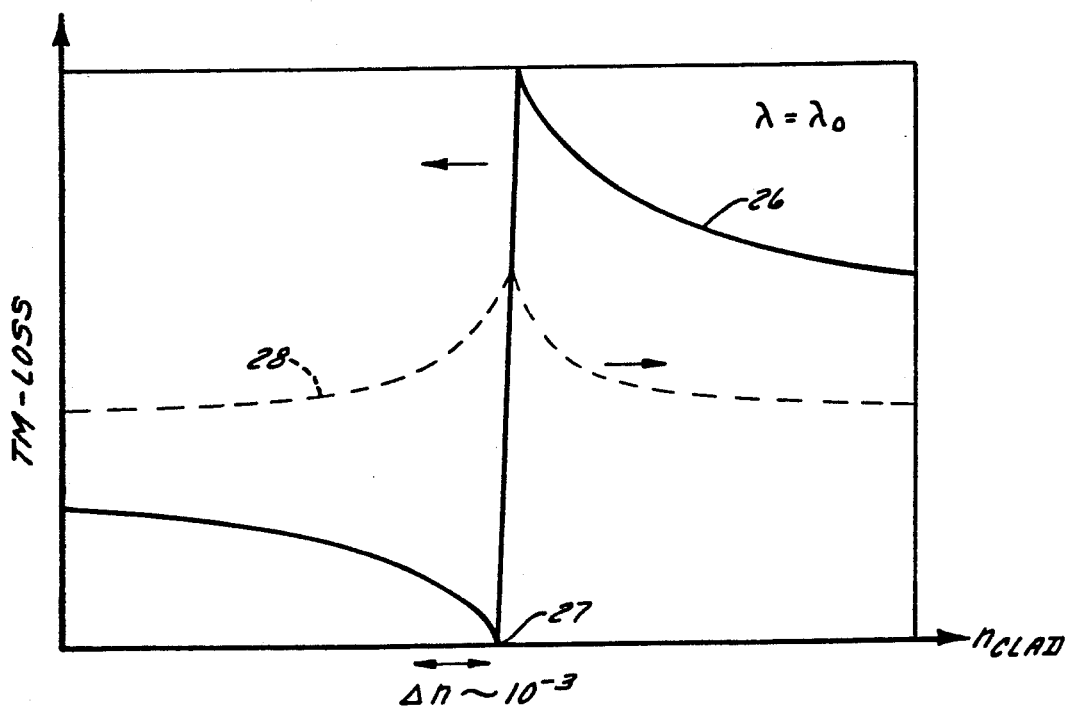

Referring now to FIG. 8A, a plot of a computer simulation of the surface plasmon wave configuration of FIG. 1 for metal thickness, $t_m$, of 100 angstroms, buffer thickness, $t_B$ of 0.1 um, and buffer index, $n_B$ ($n_B=n_4$) of 1.39 plotting TM intensity loss in db per mm and modal index versus sensing medium index is depicted. The curves of FIG. 8A are derived by solving Maxwell's equations for the single mode propagation of the TM polarization of the light wave traveling in waveguide 12. It can be seen that the curve 26, which represents TM loss, changes abruptly at a sensing medium refractive index of $n_{spw}$. At this point, TM propagation losses rise dramatically from about 2 db/mm to roughly 75 db/mm.

Referring to curve 28 in FIG. 8A, effective mode index is plotted and peaks at an electo-optic medium refractive index ($n_6=n_{spw}$) labelled 27. It is at this peak that coupling between the light wave mode and the surface plasmon wave mode is highest and thus the absorption of the TM propagation portion of the light wave mode by the surface plasmon wave mode is strongest. The point at which the refractive index $n_{spw}$ drastically changes is characteristic of resonant effects.

Figure 8B:
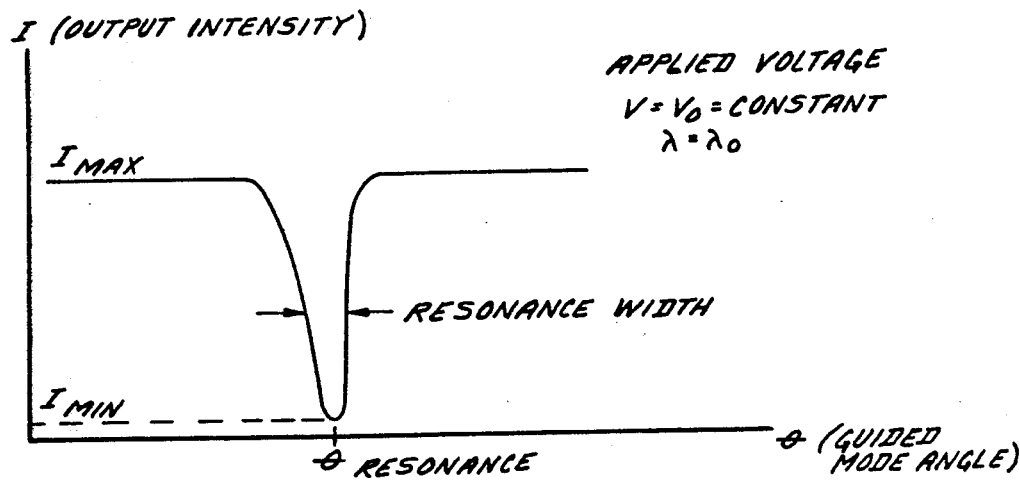
Figure 8C:
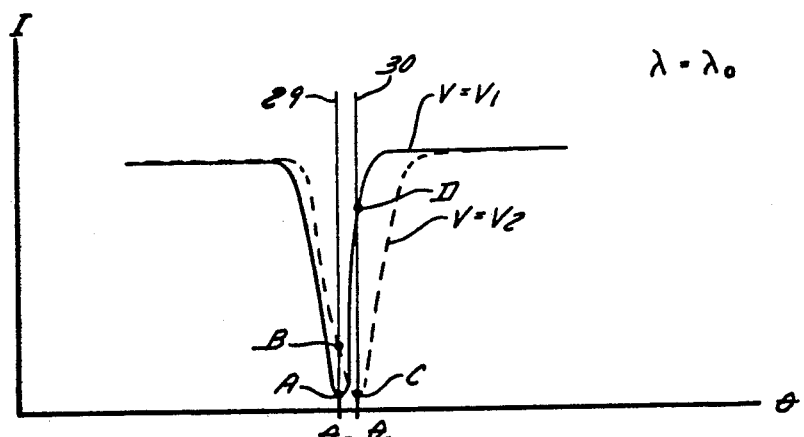
Figure 8D:
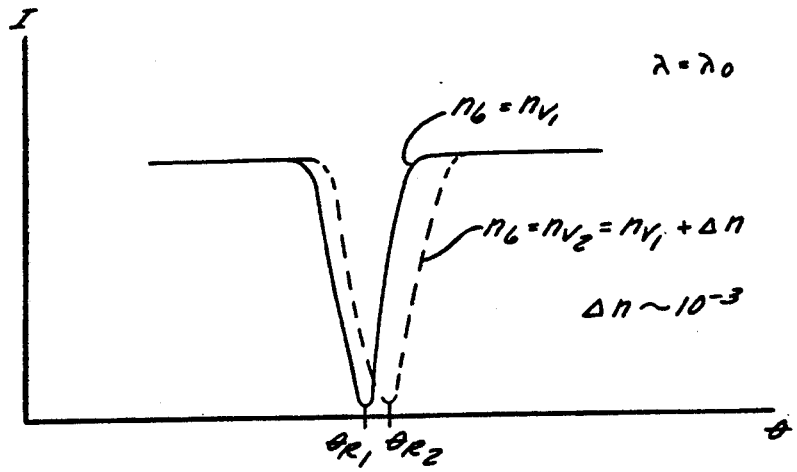

FIGS. 8B-D show the effect of varying the voltage applied to the electro-optic material-metal electrode sandwich on intensity. FIG. 8B generally shows output intensity versus the angle of the guided mode wave in the waveguide for fixed voltage and wavelength. FIG. 8C shows output intensity versus guided mode angle for two different voltages and fixed wavelength. Note that the application of voltage shifts the resonance point. Thus, when a varying voltage is applied to the metal electrodes on either side of the electro-optic material, the output intensity changes vertically between points A and B on vertical line 29 on the $V_1$ and $V_2$ curves, respectively. Note that for the $V_1$ and $V_2$ curves, the angle of the guided mode in the waveguide is different. The higher voltage $V_2$ corresponds to a higher guided mode angle. These two different guided mode angles correspond to two distinct modes in a multimode system.

For the second mode, corresponding to voltage $V_2$, output intensity shifts vertically between points C and D on vertical line 30 on the $V_2$ and $V_1$ curves, respectively. Note that the shift in output intensity (modulation depth) is greater for $R_2$. Thus, for the case shown, $R_2$ is optimum because the modulation depth is greatest.

FIG. 8D shows the refractive index changes for the two voltages $V_1$ and $V_2$. Here, $n_{v2}=n_{v1}+\Delta n$, where $n_{v2}$ equals the refractive index of the electro-optic material at voltage $V_2$, $n_{v1}$ is the refractive index of the electro-optic material at voltage $V_1$, and $\Delta n$ is the difference between the two indices at those two voltages. As noted above, a change in n of only $10^{-3}$ is needed to cause a large shift in output intensity.

The curves in FIG. 8 are different for different wavelength light waves. The wavelength of the light wave upon which the curves are based is $\lambda=0.83$ um. It can be seen that the surface plasmon wave modulator 10 of the present invention is highly sensitive to the thicknesses and refractive indices of the layers that make up surface plasmon wave modulator 10 and only a very small change in the refractive index, on the order of $10^{-3}$, is required in order to get a 3 db change in TM loss, i.e., 3 dB absorption of the TM portion of the light wave by the surface plasmon wave.

Thus, in designing the surface plasmon wave modulator 10, the laser diode light is introduced to the waveguide in such a way that its propagation wave vector is near the cut-off resonance frequency of modal characteristic of the waveguide. In other words, the wavelength of the light in waveguide 12 is adjusted close to the resonant wavelength (or vice versa depending on system constraints) and Maxwell's equations with boundary conditions are solved to obtain the FIG. 8 type curves for a particular modulator.

For a particular electro-optic material having index of refraction $n_6$, the particular resonant frequency must be found. Once that value is found the light source is set close to that resonance so that only very small changes in the refractive index of electro-optic material 20 are needed to cause the material to resonate and its surface plasmon waves to couple with the light wave mode. As a result, the intensity loss of the TM waveguide mode can achieve a very high slope of 1 dB per $3\times10^{-3}$ change in the refractive index of the externally positioned electro-optic material 20. The modulator 10's sensitivity to changes in the external refractive index modulation may be increased to $10^{-4}$ by making the length of interaction between the light and perturbed waveguide sufficiently long, i.e. larger than 10 um.

One of the major advantages of the modulator 10 of the present invention is that the interaction length is extremely short, due to the small area of electrodes 18A, 18B, which in turn results in a very short time constant for the system. The response of the modulator 10, therefore, is only slightly limited by the structure of the modulator 10 and is determined mainly by the choice of electro-optic material 20 which may include second-order non-linear polymers.

The electrodes, on the other hand, can be made of superconductive material, such as SrCaCuO or YBCuO, with extremely low ohmic loss.

It should be appreciated that the operation of the surface plasmon wave modulator 10 is based on the effect of coupling between the surface plasmon wave mode and the evanescent wave portion of the light wave mode traveling in the waveguide 12. Because the electrode-electro-optic material sandwich is located completely external of the waveguide, the surface plasmon mode affects virtually only the evanescent wave of the light wave in the waveguide 12.

An inevitable result of total internal reflection of a light wave traveling in an optical path is the occurrence of electromagnetic energy in the form of evanescent waves propagating in the cladding material in the same direction as the guided waves in the fiber core. Evanescent waves do not carry energy radially out of the fiber, but they do carry power along the fiber, as a kind of overflow of the light confined within. In the radial direction, evanescent waves are standing waves with exponentially decreasing amplitude, with the 1/e distance typically kept to a fraction of the cladding radius, on the order of 0.5 um. If the energy of the evanescent waves is removed or absorbed in any way, more comes out of the fiber core to take its place. Thus, the intensity of the light traveling in the waveguide 12 may be reduced or possibly extinguished. Normally, especially in fiber-optic applications, this power leakage is not desired, because it is detrimental to the fiber's purpose of effective light transmission over long distances. By properly controlling this leakage, through the use of the surface plasmon wave modulator 10, however, the amplitude of the light in the waveguide or fiber can be modulated thereby encoding it with information or creating a pulsed light source from a nonpulsed one.

Modulation of light amplitude can be done at extremely high frequencies such as microwave frequency, and thus the modulator 10 can achieve frequency modulation in the terahertz range. This can be accomplished with refractive index changes of the electro-optic material of only $10^{-4}$ or less by making the interaction length, L, slightly greater.

Referring now to FIG. 9, a surface plasmon wave modulator 30 in a fiber-optic implementation is depicted. In FIG. 8, a fiber-optic cable 32 having cladding 34 and core 36 is shown with a portion of its cladding removed. A buffer layer 38 is disposed on the area of the cable having the reduced cladding diameter. A metal film 40 is disposed on top of the buffer layer and an electro-optic material 42 and another metal electrode 44 are disposed on top of metal film 40. Light waves traveling in core 36 having evanescent wave portions extending outside of core 36 and into the cladding 32 and buffer layer 38 can be coupled with surface plasmon waves generated at the interface of the metal 40 and electro-optic material 42 by applying a voltage across the metal electrodes 40, 44 sufficient to cause a change in the refractive index of the electro-optic material 42 and cause it to resonate. As in the case of the integrated planar waveguide implementation of the present invention, the TM portion of the light wave propagating in the core 36 can be absorbed by the surface plasmon wave at the resonant frequency of the electro-optic material. The light in the core 36 can thereby be pulsed at extremely high frequencies to create, say for example, a pulse laser or can be encoded with information to be transferred down the fiber-optic cable over great distances.

The modulators 10 and 30 are extremely sensitive to changes in the refractive index of the electro-optic material caused by the application of the high frequency voltage to the metal electrodes, and at a particular refractive index value of the electro-optic material, the TM mode of the light wave couples into the lossy surface plasmon mode by resonant coupling.

To couple high frequency microwaves (up to 100 GHz) into the active region (the area between the ends of the electrodes) of the modulator of the present invention, a traveling wave electrode structure is needed. Referring now to FIG. 10, a high frequency (substantially greater than 1 GHz) traveling wave with a 50 ohm impedance matched electrode structure 50 is shown. In FIG. 10, coaxial cable 52 containing microwave energy is coupled to a microstrip electrode 54 which is disposed on top of electro-optic material 56 underneath which is a second microstrip electrode 58. The optical wave to be modulated travels in the planar waveguide 60 which is the uppermost layer of the structure 50. The microwave energy in the coaxial cable 52 changes the refractive index of the electro-optic material 56 and at the resonant frequency of the electro-optic material 56 the surface plasmon wave traveling at the interface of the electro-optic material 56 and the microstrip electrode 54 couples with the evanescent wave portion of the light wave traveling in planar waveguide 60. The intensity of the light wave is thus decreased in accordance with variations in the frequency and energy of the microwave energy traveling in coaxial cable 52. The essential condition is the matching of phase velocities of both electromagnetic waves, microwave and optical, which can be done by proper adjustment of the relative material constants of the various layers.

A conventional laser diode with a grin lens may be employed to edge couple the light wave, which may be in the form of laser light, into the waveguide 60. The output light may be detected by a photodetector for analysis. The frequency response of the plasmon modulator may be measured by using a microwave measurement system including a sweep oscillator to drive the electrodes, a high-speed GaAs photodetector, and a spectrum analyzer receiving the photodetector current. A desktop computer may be used to control the oscillator and spectrum analyzer and graphically represent the measurements.

It is to be understood that embodiments of the present invention not disclosed herein are fully intended to be within the scope of the claims.

What is claimed is:

1. A light modulator comprising
   a planar waveguide for carrying a guided light wave;
   a phase-matching layer disposed on the waveguide;
   two electrodes to which a varying electromagnetic field is applied;
   a material, the index of refraction of which can be varied by electromagnetic energy, sandwiched between the two electrodes;
   the sandwich disposed on the layer and within the evanescent field of the light wave.

2. The invention as defined in claim 1, the planar waveguide comprising a single mode waveguide which totally internally reflects the light wave.

3. The invention as defined in claim 1, the source of the light wave comprising a laser.

4. A light modulator comprising
   an optical fiber for carrying a guided light wave, a portion of which is not clad;
   a phase-matching layer disposed on the unclad portion of the fiber;
   a material, the index of refraction of which can be varied by electromagnetic energy, sandwiched between two metal electrodes to which a varying electromagnetic field is applied, the sandwich disposed on the layer and within the evanescent field of the light wave.

5. The invention as defined in claim 4, the optical fiber comprising a single mode waveguide which totally internally reflects the light wave.

6. The invention as defined in claim 1 or 4, the electrode material comprising a conductor such as gold.

7. The invention as defined in claim 1 or 4, the material comprising ferro-electric liquid crystal or electro-optic polymer.

8. The invention as defined in claim 1 or 4, wherein the refractive index of the material located between the electrodes is affected by light.

9. A device for modulating the intensity of a light wave traveling in a waveguide, comprising means for coupling the light wave with a surface plasmon wave generated at the interface between (1) a material, the refractive index of which is responsive to voltages applied across the material, and (2) one of two electrodes sandwiching the material by varying the voltage between the electrodes, and phase matching layer means disposed between the waveguide and the means for coupling, whereby the intensity of the light wave varies in accordance with the surface plasmon wave generated by the voltage.

10. The invention as defined in claim 9, wherein the voltage between the electrodes is generated by a microwave generator.

11. The invention as defined in claim 9, wherein the material is a dielectric.

12. The invention as defined in claim 9, wherein the material is an electro-optic material.

* * * * *